April 14, 1931. E. D. BERRY Re. 18,043
COOLER FOR CREAM AND OTHER LIQUIDS
Original Filed Nov. 7, 1924
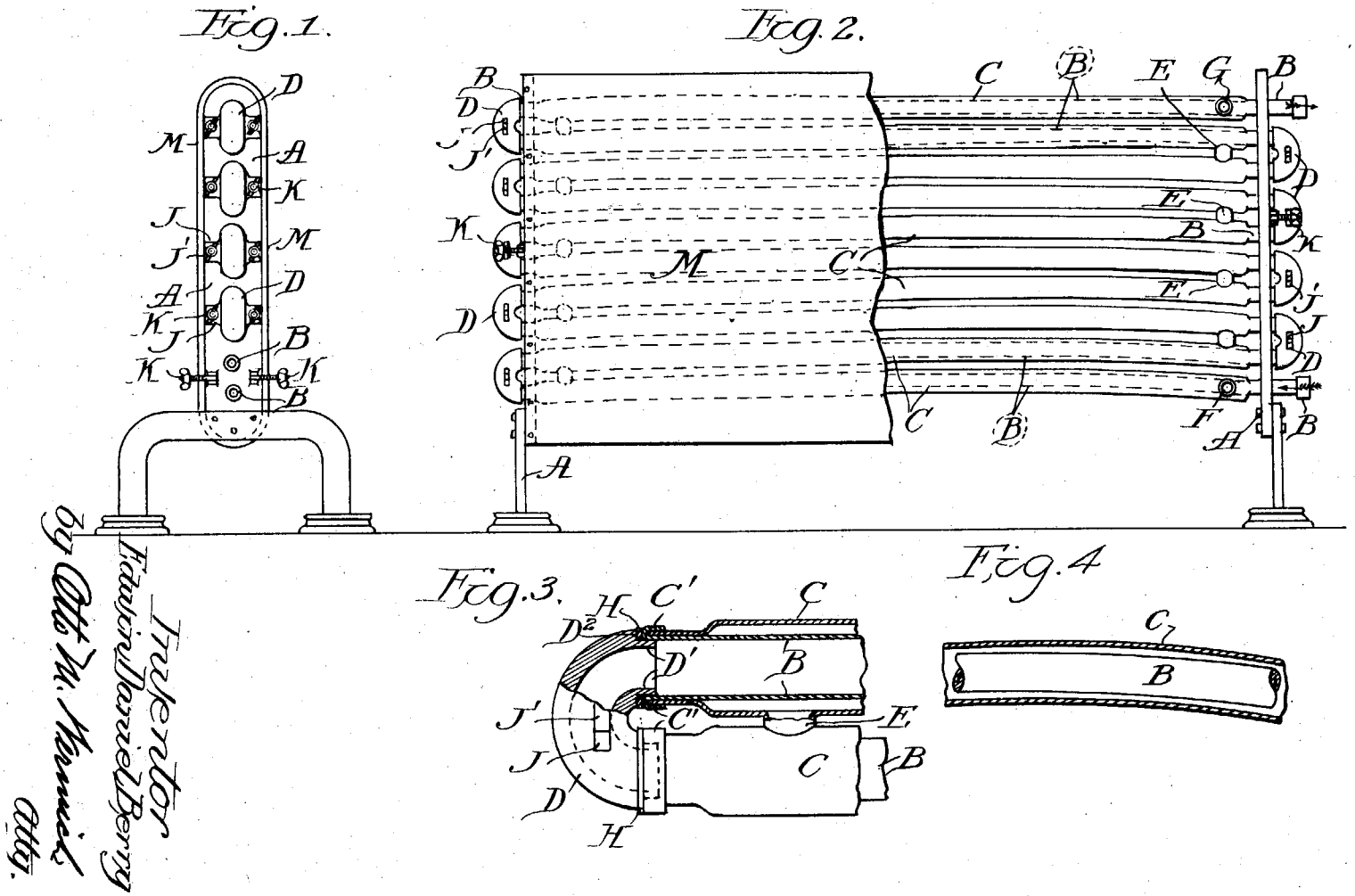
Inventor
Edwin Daniel Berry
by Otto M. Wermick
Atty.

Reissued Apr. 14, 1931

Re. 18,043

UNITED STATES PATENT OFFICE

EDWIN DANIEL BERRY, OF PALMERSTON NORTH, NEW ZEALAND, ASSIGNOR TO HENRY OTTERHOLT, OF CAPETOWN, SOUTH AFRICA

COOLER FOR CREAM AND OTHER LIQUIDS

Original No. 1,598,040, dated August 31, 1926, Serial No. 748,471, filed November 7, 1924, and in New Zealand February 16, 1924. Application for reissue filed February 27, 1928. Serial No. 257,390.

This invention relates to a new and improved construction of cooler, employing humid ammonia gas as the cooling medium, that has been devised specially for use in dairy factories and like places for the cooling of cream after pasteurization. The construction devised is, however, suitable for the treatment of other liquids and also for the employment of other fluid cooling agents than the ammonia gas referred to.

In this invention, provision is made for the cream or other liquid, while passing through the cooler, being entirely enclosed so that it cannot be affected by surrounding atmospheric conditions, as is the case with the surface coolers generally used in similar circumstances. It is generally conceded that cream while cooling becomes absorbent to the surrounding air conditions and as these sometimes are charged with fumes or odors that are deleterious to the cream, the cream is liable to be affected thereby. With this invention in use, therefore, this liability is removed.

Provision is also made in the construction of the cooler, for the cream and the cooling medium flowing side by side throughout a continuous zig-zag course and in the same direction, so that the cream at its highest temperature comes under the influence of the cooling medium at its lowest temperature, and thus especially in the case of ammonia gas as the cooling medium, any liability of freezing taking place to check the flow is obviated, and, moreover, the cooling operation carried on right throughout the course of the liquid.

The invention consists in a special construction of appliance whereby these results are obtained, and embodies special details of construction by the employment of which important advantages in the working and general care and oversight of the cooler, are obtained.

These general features and details of construction are shown in the accompanying drawings and will be hereinafter fully explained in relation thereto.

In such drawings:—

Figure 1 is an end elevation of the cooler.

Figure 2 is a side elevation thereof showing portion of an insulated casing broken away.

Figure 3 is an enlarged sectional elevation showing the manner of forming the joint between two of the tubular elements of the cooler.

Fig. 4 is a fragmentary view showing the relative curvature of one of the sets of tubes employed in the device.

The cooler, as made in accordance with this invention, is formed by a number of jacketed tubular elements arranged to extend in parallel lines, one above the other, between vertical end frames or standards A, each of such elements being formed by an internal tube B and an outer jacket tube C. The ends of the internal tube B of each element are carried out through the respective end frames A and the adjacent ends are then connected together by semi-circular unions D so arranged relatively at both ends of the cooler that a continuous zig-zag passage is obtained from one end of the bottom tube B throughout all of the tubes in turn to the end of the top tube. Each end is fitted to connect with pipes through which the cream supply is led into the bottom tube and is carried away from the top tube, the flow through the series being maintained by pumping or other desired power.

Each jacket tube C, at each end of the element, is closed in around the tube B by drawing or otherwise, and the several jacket tubes of the series are connected together by unions E obtained by welding or otherwise, disposed near their ends so that one continuous zig-zag course is obtained from the end of the lowest jacket corresponding to the inlet end of the lowest tube B, through all of the jackets in turn, to the end of the topmost jacket corresponding to the outlet end of the highest tube B.

An inlet nozzle F is provided in the end of the bottom element jacket through which the ammonia supply is led, and an outlet G of the required larger diameter leads from the end of the top element jacket, and in practice may be fitted with a pressure gauge.

Thus the cream to be cooled may be sent along within the tubes B while the cooling medium is caused to travel in the same direction within the surrounding jackets, in order to cool the cream to the required degree.

Each element is bent upwards in a slight curve from both ends to its middle so that any moisture left within the tubes will drain towards the ends. This is particularly of advantage with the inner cream tubes B as preventing the accumulation of matter therein and facilitating the cleaning of the tubes with hot water and the draining away of any residue. The end to end bending of the elements will also provide for the expansion and contraction of the tubes brought about by the conditions governing the use of the cooler, without affecting the joints with which the tubes B are connected to the end frames A. The inner tube B is also preferably given less arch from end to end than the outer jacket in order that it may bend upwards to a greater extent and still leave a clear annular space between the tube and the jacket.

The unions D are so secured in position to connect the respective ends of the tubes B that they may be readily removed and replaced whenever required. When these unions are removed the tubes B are left open from end to end, so that cleansing appliances may be pushed or drawn through them. The manner of forming the ends of the tubes and the union joints is shown in the detail Figure 3. Each tube B at its extremity is turned out over the drawn in end of the jacket tube C, so that a socket end C′ is formed. The union D at each end of the semi-circular passage through it, is formed with a shoulder D′ that is made to enter the socket end of the tube C, such end then engaging a shoulder $D^2$ formed around the first mentioned shoulder. A suitable rubber or like packing washer H is arranged upon this shoulder. On each side of the union a flange J is formed to project laterally outward, such flange having a slot J′ extending in from its edge. On the outer side of the frame A a number of bolts K are hinged so that two are provided for each union, one on each side thereof. Each bolt is designed to be turned out to enter the slot J′ of the corresponding flange J and is provided with a wing nut screwed on to its end, which by engaging the flange on the edges of the slot, will cause the union to be forced in hard upon the ends of the tubes B with a rubber washer between to make the required liquid-tight joints therewith. When the nuts are loosened, the bolts may be turned out to free the union so that the union may then be removed.

The appliance thus made will have its sides covered in by casing plates M extending between the end frames A and the space between packed with an approved insulating medium that will serve to conserve the cooling effect of the cooling medium upon the cream.

I claim:—

1. A cooler of the class described, comprising end frames, inner tubes connecting said end frames and extending through openings therein, jacket tubes, each associated with one of said inner tubes and of greater diameter than said inner tubes, said jacket tubes having diametrically reduced ends fitted around said inner tubes, said inner tubes having reversely folded ends extending around and fitted on the ends of the jacket tubes, unions connecting the inner tubes in pairs, and connections between the jacket tubes.

2. A cooler of the class described, comprising end frames, inner tubes connecting said end frames and extending through openings therein, jacket tubes, each associated with one of said inner tubes and of greater diameter than said inner tubes, said jacket tubes having diametrically reduced ends fitted around said inner tubes, said inner tubes having reversely folded ends extending around and fitted on the ends of the jacket tubes, unions connecting the inner tubes in pairs, said unions having shouldered ends fitted in the ends of said inner tubes, and packing washers on said shouldered ends of said unions and between the same and the reversely folded ends of the inner tubes.

3. In a cooling device, the combination of a plurality of pairs of tubes, one of said tubes of each pair being arranged within the other and in spaced relation thereto, the outer tube providing a passage for the cooling medium and the inner tube providing a passage for the commodity to be cooled, and said tubes being bent relatively to each other in the same direction from the ends to the center of said tubes.

4. In a cooling device, the combination of a plurality of pairs of tubes, one tube of each pair being arranged within the other and in spaced relation thereto, said tubes of each pair being bent in the same direction from the ends to the center thereof, the outer tube being connected with an adjacent outer tube, and one of said tubes being of a different arc then the other, the inner tube being connected with an adjacent inner tube, the inlet to both tubes being arranged at one end of said tubes.

5. In a cooling device, the combination of a plurality of pairs of tubes, one tube of each pair being located within the other and in spaced relation thereto, the inner tube being connected with an adjacent inner tube, and the outer tube being connected with an adjacent outer tube, said tubes of each pair being bent relatively to each other from the ends to the center thereof.

6. In a cooling device, the combination of a plurality of tubes, one of which is arranged within the other and in spaced relation to each other, both of said tubes being bent from the ends to the center thereof, and the inner tube being bent at a lesser arch than the outer tube.

7. In a cooling device, the combination of a plurality of tubes, one of which is arranged within and in spaced relation to the other, the end of one tube being extended over the edge of an end of the other tube and providing a closure for the end of the last mentioned tube.

8. In a cooling device, the combination of a plurality of tubes, one of which is arranged within and in spaced relation to the other, the end of the other tube being reduced to engage the inner tube, and one of said tubes being extended over the edge of the other to provide a closure for the end of the latter.

9. In a cooling device, the combination of a plurality of tubes, one of which is arranged within and in spaced relation to the other, one of said tubes being bent from its ends to the center thereof, and one of said tubes being extended over the edge of the other to provide a closure for the end of the latter.

10. In a cooling device, the combination of a plurality of tubes, one of which is located within and in spaced relation to the other, each of said tubes being bent from its ends to the center thereof, and one of said tubes being extended over the edge of the other to provide a closure for the end of the latter.

11. In a cooling device, the combination of a pair of tubes, one of which is located within the other and in spaced relation thereto, the end of one of the tubes being formed to receive the end of the other and provide a seal between said tubes and a seat for an element adapted to be associated therewith, which element provides a communication between one of the tubes and a similar tube of an adjacent pair.

In witness whereof, I have hereunto subscribed my name this 30th day of May, A. D. 1928.

EDWIN DANIEL BERRY.